United States Patent [19]

Mattes

[11] 4,264,934
[45] Apr. 28, 1981

[54] RATE ADAPTIVE WRITER FOR A CARD HAVING A MAGNETIZABLE SURFACE

[75] Inventor: Hans G. Mattes, Ocean Township, Monmouth County, N.J.

[73] Assignee: Bell Telephone Laboratories, Incorporated, Murray Hill, N.J.

[21] Appl. No.: 32,130

[22] Filed: Apr. 23, 1979

[51] Int. Cl.³ .................... G11B 25/04; G11B 5/09
[52] U.S. Cl. ............................. 360/2; 360/51; 235/436; 235/466; 235/482
[58] Field of Search .................. 360/2, 51; 235/493, 235/436, 449, 466, 476, 482

[56] References Cited

U.S. PATENT DOCUMENTS

| | | | |
|---|---|---|---|
| 3,597,752 | 8/1971 | Eldert et al. | 360/51 |
| 3,708,748 | 1/1973 | Nassimbene | 325/38 |
| 3,914,789 | 10/1975 | Coker Jr. et al. | 360/2 |
| 4,053,736 | 10/1977 | Banka et al. | 360/2 |

Primary Examiner—Vincent P. Canney
Attorney, Agent, or Firm—Samuel R. Williamson

[57] ABSTRACT

A rate adaptive magnetic card writer records data on a card having a magnetizable surface while the card is moved by hand through a slot on the card writer. The rate of movement of the card is determined and then used in adjusting the writing of the data such that it occurs at a rate generally consistent with the speed of the card. The written data is thereby reasonably dispersed on the card and can be read by a variable speed card reader.

12 Claims, 7 Drawing Figures

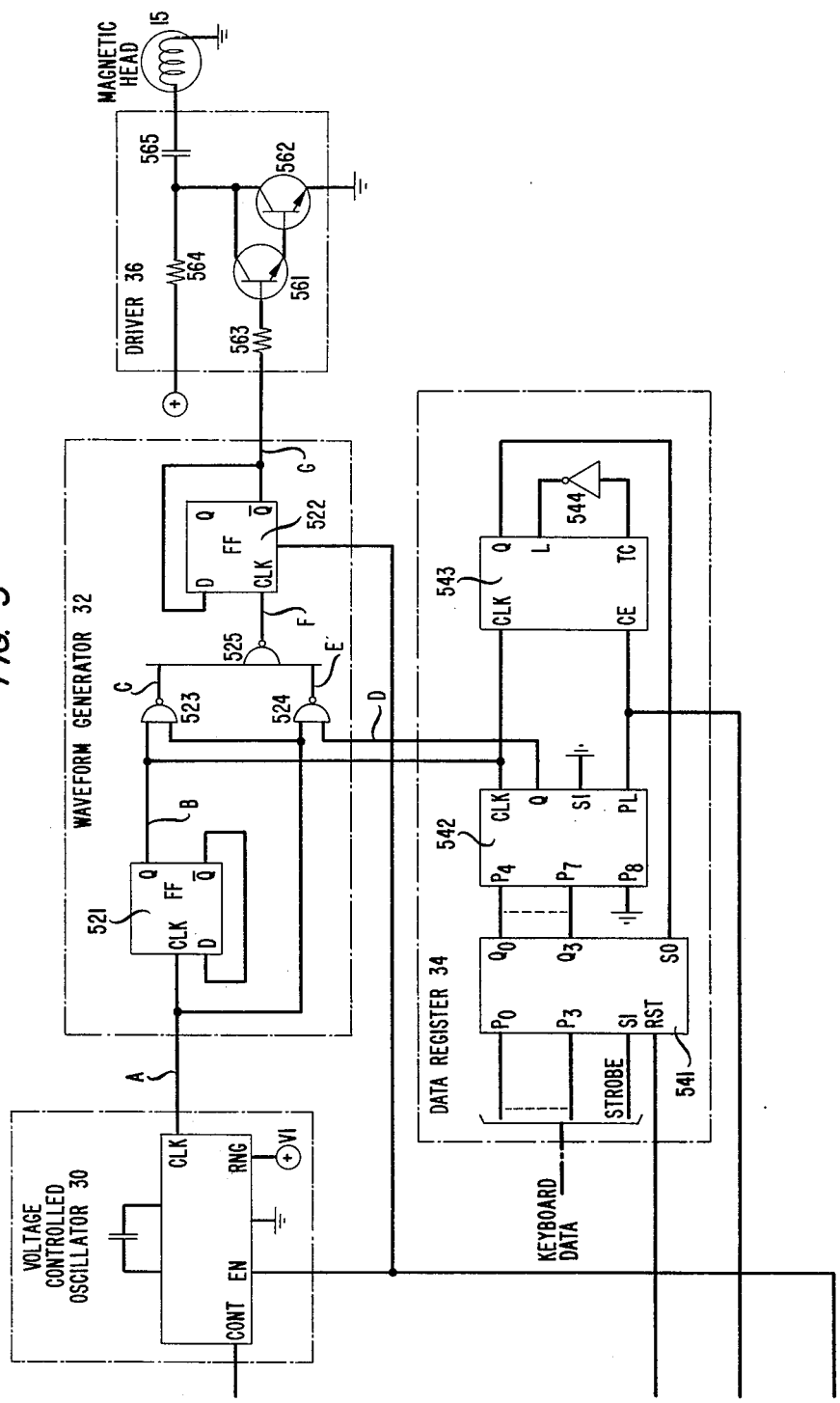

RATE ADAPTIVE WRITER FOR A CARD HAVING A MAGNETIZABLE SURFACE

TECHNICAL FIELD

This invention relates to the field of magnetic card writers and within that field to a magnetic card writer capable of writing on cards that are moved at a nonuniform or inconsistent rate of speed such as experienced with a card moved by hand.

BACKGROUND OF THE INVENTION

Magnetic encoded credit cards are increasingly utilized in a variety of different transactions enabling a customer to charge the cost of goods and services purchased to an identified account. These cards, however, are expensive to write or encode due to the need for complex electrical circuitry for the card writers that are used for encoding the required data on the card. Some prior art magnetic card writers require precision drive mechanisms which propel the credit card past the record head. The use of such a precision drive mechanism is to ensure the writing of uniform bit spacing of an encoded data stream on the card so that the data can be synchronized with an internal clock source as it is retrieved from the magnetic card by a card reader.

To provide this synchronizing information on the magnetic card, other prior art writers encode a second row of timing information adjacent to the row containing the encoded data on the card. Thus, the data signal and the clock signal are both read by a card reader at the same time, thereby avoiding the use of an internal clock. Once again, however, the related circuitry is complex and expensive in the magnetic card writer and the associated card reader.

Some magnetic cards, moreover, are now encoded with self-clocking codes, such as the Aiken code, in which a signal containing both data and timing information is represented by a single bit stream. The signal is a binary signal of two-frequency coherent phase (biphase) encoding which combines serial data with clock information in that if a transition occurs between clock bits, the data is a "1" and if no transition occurs, the data is a "0". Card readers which use the width of the preceding bit as a basis for establishing an appropriate viewing window for the present bit can thereby read or decode this information on the magnetic card substantially independent of reading speed variations.

In a realization that card readers do not have to be precisely driven when a code such as the Aiken code is used, magnetic card writers have been developed that consider the insensitivity of these card readers to reading speed variations which also equate to an insensitivity to low frequency variations in the writing speed. These writers thus avoid the requirement for a precision drive mechanism in the writing of cards. Such writers are disclosed in U.S. Pat. No. 3,708,748, issued to E. G. Nassimbene on Jan. 2, 1973, and U.S. Pat. No. 3,597,752, issued to C. Eldert et al. on Aug. 3, 1971.

In order to write cards manually, however, a means must be provided to assure that the data will all be recorded on the card and reasonably dispersed thereupon. Since different individuals will move a card through the card writer at different rates, some means must be provided to determine this movement rate and then adjust the writing rate to the individual using the card writer. It is, therefore, desirable to provide a simple and inexpensive rate adaptive card writer which, when using the Aiken or other similar self-clocking code, will allow the writing of magnetic cards that can be read by single head rate adaptive readers.

SUMMARY OF THE INVENTION

In accordance with the invention, there is provided a rate adaptive card writer for encoding data on a magnetic stripe of a card which is moved through the writer at a nonuniform or inconsistent rate such as when moved by hand. The writer includes encoding data means for translating a signal into data suitable for writing by a recording means onto a magnetic stripe of a card as the card is advanced relative to the recording means. Speed determining means are also included to sense the rate of movement of the card relative to the recording means. In response to the speed determining means, control means adjust the writing rate of the recording means so that all of the desired data is written on the magnetic stripe on the card and reasonably dispersed thereacross.

BRIEF DESCRIPTION OF THE DRAWING

The invention will be more fully comprehended from the following detailed description and the accompanying drawing in which:

FIGS. 4 and 5 present a schematic diagram showing the detail circuitry of a second embodiment of the rate adaptive writer of FIG. 1;

FIG. 7 illustrates the spacial arrangement of FIGS. 2 and 3 and of FIGS. 4 and 5.

DETAILED DESCRIPTION

Figure 1:
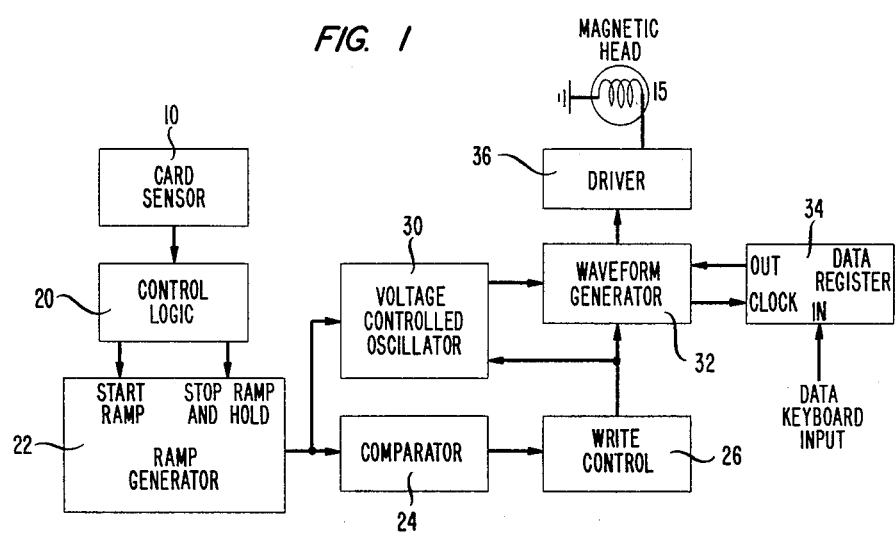
FIG. 1 is a block diagram of a rate adaptive card writer showing the major functional components of the writer and their general interconnection with each other in accordance with the present invention.

Referring now to FIG. 1 of the drawing, a rate adaptive card writer is shown in accordance with the present invention. In the operation of the card writer, a card is inserted into an accommodating slot on the writer containing a card sensor 10 and a magnetic recording head 15. The card is moved by hand through the slot, activating card sensor 10 and passes adjacent to the magnetic recording head 15 which records thereupon. Connected to the card sensor 10 is a control logic circuit 20 which operates two sections of a ramp generator and hold circuit 22. The control logic circuit 20 responds to the card sensor 10 by starting and stopping the ramp generator section and activating the hold section. The time interval obtained by the card sensor 10 is used as a measure of the rate of movement of the card and is electrically represented by the ramp generator and hold circuit voltage.

Connected to the ramp generator and hold circuit 22 is a comparator 24 which activates once the leading portion of the card is located slightly beyond the magnetic record head 15. Also connected to the ramp generator and hold circuit 22 is a voltage-controlled oscillator 30 whose rate of oscillation is controlled by the hold voltage provided by the ramp generator and hold circuit 22.

In response to the activate signal provided by comparator 24, a write control circuit 26 provides an enabling signal to the voltage-controlled oscillator 30 and also to a waveform generator 32. Input data from a keyboard or the like is stored in a data register 34 and coupled therefrom through the waveform generator 32 and a driver 36 to the magnetic head 15 for recording on the magnetic stripe of the card.

Figure 2:
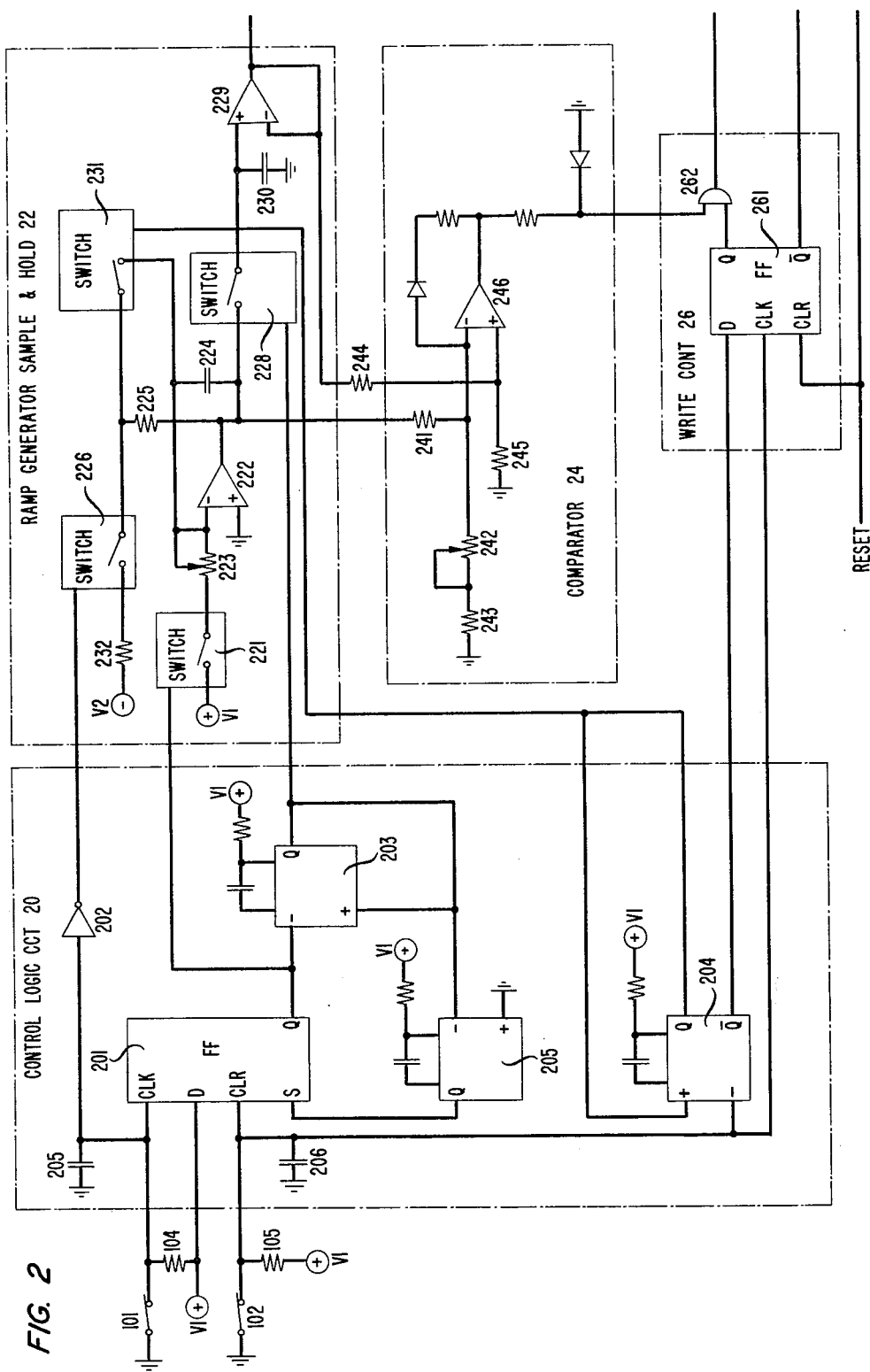
FIGS. 2 and 3 present a schematic diagram showing the detail circuitry of a first embodiment of the rate adaptive writer of FIG. 1.
Figure 3:
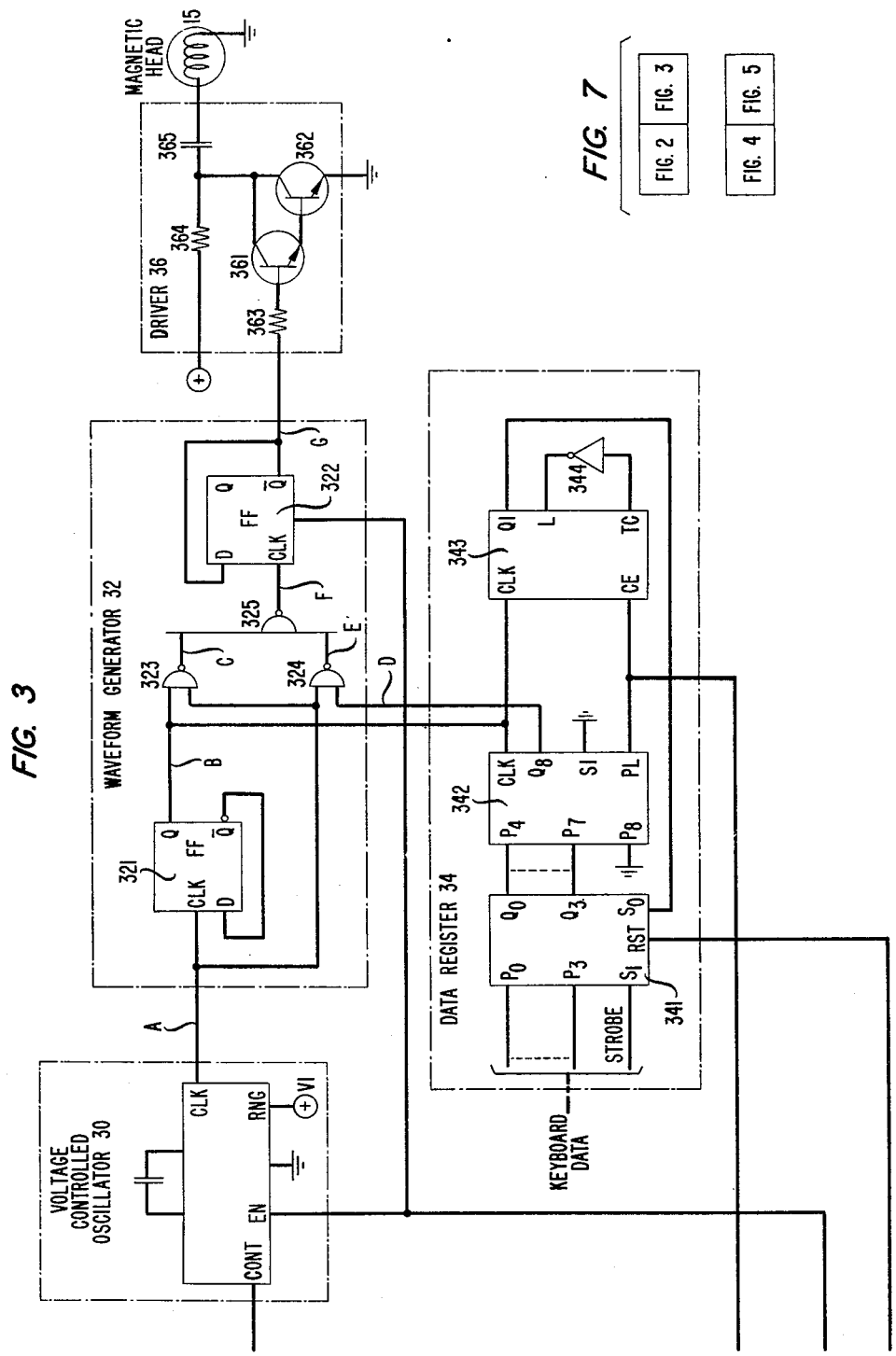

Referring now to FIGS. 2 and 3, there is shown a schematic representation of a rate adaptive card writer operative in accordance with the principles of the invention. A card sensor consisting of switches 101 and 102, are located in a narrow slot along with the magnetic head 15. A magnetic card to be recorded is translated in this slot by hand. The translation of the card is in a direction such that switch 101 is activated and then switch 102 is activated. The card then passes adjacent to the magnetic head 15 at which time the desired data is recorded on the card.

The outputs from switches 101 and 102 are coupled to a control logic circuit 20 which consists of flip-flop 201, inverter 202, monostable multivibrators 203, 204 and 205. The clock input to flip-flop 201 is activated by the card opening the normally grounded switch 101. Resistor 104, which provides a pull-up voltage to the clock input of flip-flop 201, couples a high level onto the clock input causing the Q output of flip-flop 201 to also go to a high level. The resistor 104 and a capacitor 205 also provide filtering against contact bounce of switch 101. Similarly, a resistor 105 and a capacitor 206 provide filtering for switch 102.

The Q output of flip-flop 201 is coupled to a ramp generator and sample and hold circuit 22 where it activates a switch 221. Connected to one side of switch 221 is a positive voltage potential V1. On the other side of switch 221 is a Miller integrator 222 which is connected via variable resistor 223. A capacitor 224 contains a charge when the card writer is in its quiescent state, this charge providing integrator 222 with an initial positive voltage output. The output voltage level is determined by resistors 232 and 225 connected in series through switch 226 to a postive voltage potential V2. When switch 221 is activated, the output voltage of integrator 222 decreases toward zero from its initial positive voltage level. To disconnect the voltage potential provided to resistor 232 from the V2 source, inverter 202 causes switch 226 to open when switch 101 is activated.

As the magnetic card advances further along in the slot, normally closed switch 102 is opened causing flip-flop 201 to clear. This halts the discharge of capacitor 224 and the decrease in the output voltage of amplifier 222.

A sample and hold interval occurs at this juncture. Monostable multivibrator 203 which is connected to the Q output of flip-flop 201 is activated by the clearing thereof. The output of monostable multivibrator 203 is used to close a switch 228 momentarily connecting the output of integrator 222 with the input of an amplifier 229. While switch 228 is closed, a capacitor 230 charges or discharges to the voltage across capacitor 224. Switch 228 is opened at the end of the pulse cycle of monostable multivibrator 203 with the result being the amplifier 229 has at its output a level of the ramp voltage which reflects the time required for the magnetic card to be moved between switches 101 and 102.

This voltage level is coupled to a voltage-controlled oscillator 30 and determines its frequency of oscillation. The voltage-controlled oscillator 30, which serves as a clock for the card writer, then controls the writing of data on the card at a rate generally consistent with the speed of the card.

The monostable multivibrator 205 is triggered at the end of the sample and hold interval by monostable multivibrator 203. As a result, monostable multivibrator 205 sets the Q output of flip-flop 201 high, once again closing switch 221 to restart the voltage ramp. The ramp then continues toward zero from its previously halted voltage level.

A comparator circuit 24 provides an activation signal once the leading edge of the card has traveled from switch 102 to slightly beyond the record head. The comparator circuit 24 has as its input the ramp voltage, which is the output of integrator 222, and the sample and hold voltage, which is the output of amplifier 229. As the ramp voltage level, reduced by divider resistors 241, 242 and 243, drops to below that of the sample and hold voltage determined by resistors 244 and 245, the output of comparator 246 changes from a low to a high level. It is at this juncture that the card is properly located with respect to the magnetic head 15 for recording.

A write control circuit 26 containing a flip-flop 261 and an AND gate 262 provides the regulation for the card-writer circuit. Activated by the opening of switch 102, flip-flop 261 has its $\overline{Q}$ output set at a low level and its Q output at a high level. The low level output is coupled to the enable input of the voltage-controlled oscillator 30 allowing it to oscillate at a frequency determined by the voltage also coupled thereto from amplifier 229. The high level output is coupled to one of the two inputs of AND gate 262. The other input of AND gate 262 is the output of comparator 246.

In the recording of a magnetic card, the data is entered into the card writer before the writing operation takes place. To accomplish this, a keyboard data entry with a strobe input for sequencing the data into a data register circuit 34 is provided. The data register circuit 34 includes a storage register 341 which accepts entry of 64 bytes of 4 bit data. The data format of the storage register 341 is on a first-in-first-out basis. Also included in this circuit is a parallel-to-serial shift register 342 that is connected to the storage register 341. This shift register changes the 4 bit parallel data stream from the storage register 341 to a serial data stream suitable for driving a waveform generator circuit 32 to be discussed later. In addition, a binary counter section, comprising counter 343 and inverter 344, is included to provide the sequencing and timing information necessary to generate the serial data stream used by the waveform generator circuit 32.

The waveform generator circuit 32 accepts as its input the signals from the voltage-controlled oscillator 30 and the data register circuit 34 and produces at its output an appropriately encoded waveform reflective of the data previously entered via a keyboard. Contained within the waveform generator circuit 32 are flip-flops 321 and 322 and three two-input NAND gates 323, 324 and 325.

Figure 6:
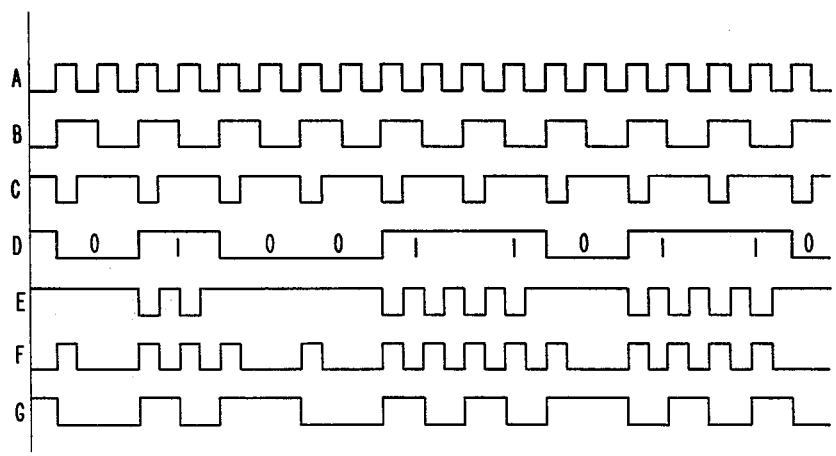
FIG. 6 is a timing diagram depicting waveforms of particular signals employed in this invention.

The waveform generator circuit can be more easily understood when FIG. 6 and the waveforms depicted thereon are considered in conjunction with FIG. 3. The clock input to flip-flop 321 is provided over line A from the voltage-controlled oscillator 30. Toggling at half the rate of its clock input, flip-flop 321 provides a reduced clock rate to the shift register 342 and to one of the two inputs of NAND gate 323. The other input of NAND gate 323 and one of the two inputs of NAND gate 324 is the signal provided by the voltage-controlled oscillator 30 over line A. The remaining input to NAND gate 324 is the serial data stream of ones and zeros from shift register 342 which is applied over line D. The outputs of NAND gates 323 and 324 are respectively applied over line C and line E to the two inputs of NAND gate 325 producing the waveform on line F. Connected in a toggle configuration, flip-flop 322 receives the signal on line F and provides as its output the signal on line G. Held in a clear state by flip-flop 261, flip-flop 322 is inhibited from generating a signal prior to a card interrupting switch 102.

A driver circuit consisting of Darlington pair transistors 361 and 362, resistors 363 and 364, and a capacitor 365 amplify the signal applied thereto on line G and applies this signal to the magnetic head 15 for recording on the magnetic card.

The output of the waveform generator as seen on line G is configured to correspond to the Aiken or two-frequency coherent phase code. The characteristics of the electrical representation of this code are as follows: a transition between the two possible levels or states of the signal occurs regularly at the beginning and end of each bit interval; an irregular transition occurring intermediate to the regular transitions indicates one output data state while the absence of such an irregular transition indicates the other or second output data state. Thus from an examination of FIG. 6, it can be seen that the data on line D is contained in the waveform on line G. That is, the "1" data state is represented in the irregular transistions, while the "0" data state and the timing information essential to extracting the data is represented in the regular transitions.

Card readers suitable for decoding the information written on the magnetic card by the rate adaptive card writer are available in the prior art. These card readers are disclosed as being able to decode the information written on a magnetic card substantially independent of reading speed variations. Examples of such card readers are U.S. Pat. No. 3,737,632, issued to R. O. Barnes on June 5, 1973, wherein a single head rate adaptive nonsynchronous demodulator or reader is disclosed; and U.S. Pat. No. 3,938,090, issued to V. S. Borison et al. on Feb. 10, 1976, wherein a single head reader which decodes magnetic stripes independent of reading speed variations is disclosed. In that these card readers are insensitive to reading speed variations, they will also be insensitive to writing speed variations. These card readers operate on a comparison scheme of using the time frame of the preceding input pulse and comparing it against the bi-phase information portion of the next succeeding input pulse to determine whether it is a binary one or a binary zero. If a transition occurs within a certain percentage of the reference time frame, it denotes a binary one. If, on the other hand, the transition occurs outside of this percentage, it denotes a binary zero. Initial calibration of the card reader is obtained by encoding a string of leading zeros onto the card. This dynamic reference technique thus compensates for varying rates in the nonsynchronous bi-phase input signal not only due to reading speed variations, but to writing speed variations as well.

Referring once again to the card writing operation, as the magnetic card travels the distance between switch 102 and the magnetic head 15, a zero data pattern is produced by the waveform generator circuit 32 and driver circuit 36. This is accomplished by having AND gate 262, while in the low state, force the shift register 342 into a serial mode where the output will be a serial stream of zero data bits. When the output of comparator 246 goes to a high level, the output of AND gate 262 also goes to a high level since the Q output of flip-flop 261 is at a high level at this point. As previously indicated, a change in the state of comparator 246 indicates that the card is properly located with respect to the magnetic head 15 to begin recording of the data.

The high level output from comparator 246 is coupled via AND gate 262 to the count enable input of binary counter 343. This enables counter 343, which in turn provides a clock pulse to shift the data from the data register 341 to the shift register 342. The counter 343 is set to count a 4 bit cycle, then is reset by inverter 344. A new data word is shifted out of the data register 341 in the middle of each 4 bit cycle and loaded into the shift register 342 at the conclusion of the cycle. The high level output from comparator 246 is also coupled via AND gate 262 to the mode control input of the shift register 342. This high level forces the shift register 342 into a parallel mode. Parallel data from the storage register 341 is then shifted out of the shift register 342 in a serial stream to the waveform generator circuit 32 for encoding in a form suitable for writing on the card.

After the writing operation is complete, the circuit must be prepared for the encoding of another card. To this end, a multivibrator 204 is incorporated into the circuit design to insure that capacitor 224 is recharged after each writing operation. As the trailing edge of the card leaves switch 102, monostable multivibrator 204 is activated. Switch 231 is closed thereby and resistor 225 is placed in parallel with capacitor 224 for a short time period. Capacitor 224 is thus prepared for another write operation by being charged back up to its quiescent voltage level.

The foregoing describes one embodiment of a rate adaptive card writer which will be satisfactory for many applications. Various modifications can be made to this basic writer, however, to provide many different types of operations. One such modification is the circuit shown in FIGS. 4 and 5. Such a circuit allows for the use of a card sensor with one sensing switch and the manual passing of a magnetic card to be recorded through a cooperating slot on the writer twice. The first pass determines the length of time the card is in the slot providing a measure of the card's speed. On the second pass the card writer encodes the data onto the card. Studies have shown that the speed of a second timely pass by the same individual will differ very little from that of the first. Thus using the information obtained from the first pass on the second pass, the card writer encodes data onto the card reasonably dispersing it thereacross.

The same basic components are used in implementing this circuit embodiment and the circuit embodiment of FIGS. 2 and 3. Because of this and the detailed description given that embodiment, this embodiment will be described in similar detail only where the operation of the component sections differ substantially and sufficient clarity of operation might not be readily apparent from the description provided in that embodiment.

Figure 4:
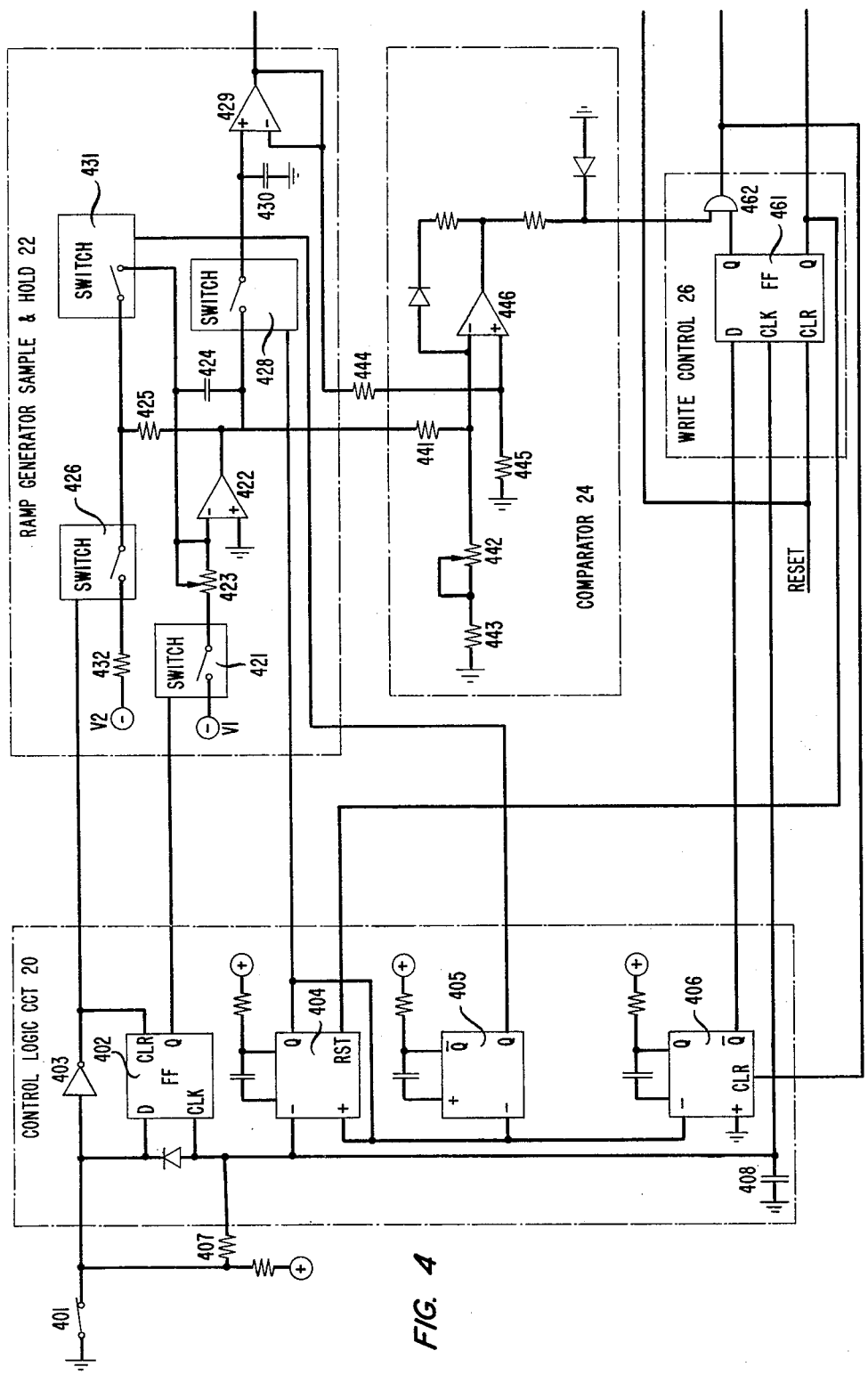

Referring now to FIGS. 4 and 5, a card sensor consisting of a switch 401 is located in a narrow accommodating slot along with the magnetic head 15. The card to be recorded is translated by hand through the slot. Entry of the card into the slot is detected by the opening of switch 401. Translation of the card is in a direction such that switch 401 is activated and then the card passes adjacent to the magnetic head 15.

Connected to switch 401 is a control logic circuit 20 consisting of a D-type flip-flop 402, inverter 403, and monostable multivibrators 404, 405 and 406. When the card opens the normally grounded switch 401, the input to inverter 403 and the D input to flip-flop 402 both go high. Resistor 407 and capacitor 408 delay the clock input of flip-flop 402 from going high until its reset input is set low by inverter 403. After the delay, the high on the clock input causes the Q output of flip-flop 402 to also go to a high level.

A ramp generator and sample and hold circuit 22 is activated by the control logic circuit 20. Within the ramp generator and sample and hold circuit are a Miller integrator 422, amplifier 429, switches 421, 426, 428 and 431, and resistors 432 and 425. Switch 421 is activated by a high level from the Q output of flip-flop 402 and switch 426 is activated by the high level output of inverter 403. Miller integrator 422 acquires an initial positive voltage determined by resistors 436 and 425 when the card writer is in the quiescent state. When switch 421 is closed by flip-flop 402, the output voltage of integrator 422 decreases toward zero. During this time inverter 403 is holding switch 426 in the open position.

When the trailing edge of the card passes, allowing switch 401 to close, inverter 403 changes state resetting flip-flop 402. Switch 428 is also closed momentarily by the activation of monostable multivibrator 404. At the same time, switch 421 is operated halting the negative-going ramp voltage of integrator 422. While switch 428 is closed, capacitor 430 charges or discharges to the voltage at the output of integrator 422, transferring this voltage to amplifier 429. Switch 428 then opens at the end of the pulse cycle of monostable multivibrator 404.

The time interval between switch 401 opening and closing is a measure of the speed of the card and is electrically represented by the voltage level provided by the ramp generator and sample and hold circuit 22 to a voltage-controlled oscillator 30. The frequency of the voltage-controlled oscillator 30 is controlled by this voltage and the encoding rate of the data onto the card is adjusted to reflect this previously measured card speed.

A monostable multivibrator 405 is triggered at the end of the pulse cycle of monostable multivibrator 404. Switch 431 is closed thereby and resistor 425 is placed in parallel with capacitor 424 for a short time period. Capacitor 424 thus recharges to its quiescent value where it must be for the beginning of the second pass of the card.

Another monostable multivibrator 406 is also triggered at the end of the pulse cycle of monostable multivibrator 404. This multivibrator has a time constant on the order of seconds and provides a high output to a write enable control circuit 26, indicating that the card has completely passed through switch 401 a first time. The high at the Q output of monostable multivibrator 406 is coupled to the D input of a D-type flip-flop 461 within the write control circuit 26.

As switch 401 opens signaling the entry of the card into the slot a second time, the clock input to flip-flop 461 goes high. Since at this point the D input is still being held high by monostable multivibrator 406, flip-flop 461 changes state with its Q output also going to a high level. In addition, the $\overline{Q}$ output of flip-flop 461 goes low and inhibits monostable multivibrator 404 from activating on the second pass of the card.

A comparator circuit 24 provides an activation signal once the card is properly located with respect to the magnetic head 15 for recording. The comparator circuit 24 has coupled to it the two voltages at the output of integrator 422 and amplifier 429 for comparison. Divider resistors 444 and 445 reduce the voltage level applied to the comparator 446 from amplifier 429. Also divider resistors 441, 442 and 443 reduce the voltage level applied to the comparator 446 from integrator 422. As the voltage applied to the comparator from the output of integrator 422 discharges to below that applied to the comparator from the output of amplifier 429, the output of comparator 446 changes from a low to a high level.

The output of comparator 446, along with the Q output of flip-flop 461, is applied to a two input AND gate 462 in the write control circuit 26. When the Q output of flip-flop 461 is high and the output of comparator 446 is high, AND gate 462 changes to a high state allowing the card writer circuitry to encode data onto the card.

A data register circuit 34 includes a storage register 541 which accepts entry of 64 bytes of 4 bit data. Also included in this circuit is a parallel-to-serial shift register 542 that is connected to the storage register 541 and also accepts the output of AND gate 462. The shift register 542 changes the 4 bit parallel data stream from storage register 541 to a serial data stream. In addition, a binary counter section, comprising binary counter 543, and an inverter 544, is included to provide the sequencing and timing information necessary to generate the serial data stream used by the waveform generator circuit 32. Signals from the voltage-controlled oscillator 30 and the data register circuit 34 are used by the waveform generator circuit 32 in producing the waveform at its output which is reflective of the data previously entered by a keyboard or the like into the storage register 541. The circuitry achieving this within the waveform generator are flip-flops 521 and 522 and three two-input NAND gates 523, 524, and 525. In understanding the waveform generator circuit 32, reference to the waveforms depicted in FIG. 6 may be helpful since the waveforms of this circuit are shown in that figure.

As the magnetic card travels the distance between switch 401 and the magnetic head 15 on the second pass, a zero data pattern is produced by the waveform generator circuit 32. This is accomplished by having flip-flop 461 enable the voltage-controlled oscillator 30, and flip-flop 522, thereby allowing the data to be processed through the waveform generator 32. At the same time, the comparator 446 is in the low state and the shift register 542 is in a serial mode where the output is a serial stream of zero data bits. A change in the state of comparator 446 causes the shift register 542 to shift to a parallel mode. Data from the storage register 541 is then shifted out of the shift register 542 to the waveform generator circuit 32 where it is encoded in a form suitable for writing on the card.

Coupled to the output of waveform generator circuit 32 is a driver circuit 36, consisting of Darlington pair transistors 561 and 562, resistors 563 and 564, and a capacitor 565, to amplify the encoded data signal and apply it to the magnetic head 15 for recording onto the magnetic card.

Many other modifications of this basic writer are possible and may obviously be implemented by those skilled in the art without departing from the spirit and scope of the invention. An example of such a modification is a card writer that has one card sensor switch and requires one manual pass of a magnetic card through an accommodating slot on the writer. The card is moved in the slot first activating and deactivating the sensor switch which provides information as to the speed of the card. The card, continuing in the slot, then passes adjacent to the magnetic record head where the writer, its rate adjusted to the activation and deactivation of the sensor switch, encodes the card with the desired data and at a density generally reflecting the rate of movement of the card. Another implementation of the writer may be obtained by those skilled in the art by using computer technology to provide the necessary logic control, storage, sampling and waveform generation provided by the circuitry shown in the described embodiments of this invention. It is, therefore, to be understood that within the scope of the appended claims the invention may be practiced otherwise than as specifically described.

I claim:

1. Apparatus for encoding data and for recording the data on a card having a magnetizable surface, the apparatus comprising
    encoding data means (32, 34, 36);
    recording means (15) for writing the data provided by the encoding data means onto the magnetizable surface of the card as the card is advanced relative to the recording means;
    CHARACTERIZED IN THAT
    the apparatus includes speed determining means (10, 20, 22) for sensing the average rate of movement of the card relative to the recording means for the entire period that the card is moving; and
    control means (24, 26, 30) for adjusting the writing rate of the recording means in response to the speed determining means.

2. The apparatus as described in claim 1 wherein the speed determining means include sensor means (10) responsive to movement of the card as the card is advanced relative to the recording means, the sensor means providing a measure of a time period during which the card is located adjacent to the recording means.

3. The apparatus as described in claim 2 further characterized in that the recording means responsive to the control means write the encoded data onto the magnetizable surface of the card within the time period.

4. The apparatus as described in claim 3 wherein the sensor means comprise a first switch (101) and a second switch (102) fixedly spaced apart, the first switch being activated by the leading edge of the card before the second switch is activated by the leading edge of the card as the card is advanced relative to the recording means, the difference in time between the activation of the first and second switch being the time period, and reflects the movement rate of the card relative to the recording means, the control means, responsive to the time period, directing the writing rate of the recording means onto the magnetizable surface of the card so that the data is uniformly dispersed over the magnetizable surface of the card.

5. The apparatus as described in claim 3 wherein the sensor means comprise a switch (401) which is activated by the leading edge of the card and is deactivated by the trailing edge of the card, the difference in time between the activation and deactivation of the switch reflecting the time period, the movement of the card through the sensor means a first occurrence determines the rate of movement of the card relative to the recording means, the movement of the card through the switching means a second occurrence results in the recording means writing onto the magnetizable surface of the card at a rate adjusted by the control means so that the data is uniformly dispersed over the magnetizable surface of the card.

6. A method for encoding data and for recording the data on a card having a magnetizable surface comprising the steps of
    producing an encoded data signal representative of an input signal;
    recording the data signal on the magnetizable surface of the card with a record head as the card is advanced relative to the record head;
    CHARACTERIZED IN THAT after the producing step and before the recording step the method further includes in order the steps of
    determining the average rate of movement of the card relative to the record head for the entire period that the card is moving; and
    adjusting the recording rate in response to the rate of movement of the card relative to the record head.

7. A method for encoding and recording data on a card according to claim 6 wherein the determining step comprises
    activating a switch by the leading edge of the card as the card is advanced relative to the record head;
    deactivating the switch by the trailing edge of the card as the card is advanced relative to the record head; and
    providing a measure of a time period during which the magnetizable surface of the card is located adjacent to the record head in response to the activation and deactivation of the switch.

8. A method for encoding and recording data on a card according to claim 6 wherein the determining step comprises
    activating a first switch by the leading edge of the card as the card is advanced relative to the record head;
    activating a second switch by the leading edge of the card as the card is advanced relative to the record head; and
    providing a measure of a time period during which the magnetizable surface of the card is located adjacent to the record head in response to the activation of the first and second switches.

9. A method for encoding and recording data on a card according to claim 7 or 8 wherein the adjusting step comprises
    directing the recording rate in response to the time period; and
    dispersing the data uniformly over the magnetizable surface of the card.

10. Apparatus for encoding data and for recording the data on a card having a magnetizable surface, the apparatus comprising
    encoding data means (32, 34, 36);
    recording means (15) for writing the data provided by the encoding data means onto the magnetizable surface of the card as the card is advanced relative to the recording means;
    CHARACTERIZED IN THAT
    the apparatus includes speed determining means (10, 20, 22) for sensing the rate of movement of the card relative to the recording means;

control means (24, 26, 30) for adjusting the writing rate of the recording means in response to the speed determing means, the speed determing means including sensor means (10) responsive to movement of the card as the card is advanced relative to the recording means, the sensor means providing a measure of a time period during which the card is located adjacent to the recording means, and the recording means in response to the control means write the encoded data onto the magnetizable surface of the card within the time period, the sensor means comprising a switch (401) which is activated by the leading edge of the card and is deactivated by the trailing edge of the card, the difference in time between the activation and deactivation of the switch reflecting the time period, the movement of the card through the sensor means a first occurrence determines the rate of movement of the card relative to the recording means, the movement of the card through the switching means a second occurrence results in the recording means writing onto the magnetizable surface of the card at a rate adjusted by the control means so that the data is uniformly dispersed over the magnetizable surface of the card.

11. A method for encoding data and for recording the data on a card having a magnetizable surface comprising the steps of producing an encoded data signal representative of an input signal;

recording the data signal on the magnetizable surface of the card with a record head as the card is advanced relative to the record head;

CHARACTERIZED IN THAT after the producing step and before the recording step the method further includes in order the steps of determining the rate of movement of the card relative to the record head by activating a switch by the leading edge of the card as the card is advanced relative to the record head, deactivating the switch by the trailing edge of the card as the card is advanced relative to the record head, and providing a measure of a time period during which the magnetizable surface of the card is located adjacent to the record head in response to the activation and deactivation of the switch; and adjusting the recording rate in response to the rate of movement of the card relative to the record head.

12. A method for encoding and recording data on a card according to claim 11 wherein the adjusting step comprises directing the recording rate in response to the time period; and dispersing the data uniformly over the magnetizable surface of the card.

* * * * *